United States Patent
Khatri et al.

(10) Patent No.: US 11,572,920 B2
(45) Date of Patent: Feb. 7, 2023

(54) ELECTRIC MACHINE CONTROL USING LONG CABLES

(71) Applicant: Calnetix Technologies, LLC, Cerritos, CA (US)

(72) Inventors: Rasish Khatri, Cerritos, CA (US); Alexei Filatov, Irvine, CA (US); Larry Hawkins, Manhattan Beach, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 44 days.

(21) Appl. No.: 17/342,213

(22) Filed: Jun. 8, 2021

(65) Prior Publication Data

US 2022/0389959 A1    Dec. 8, 2022

(51) Int. Cl.
| | |
|---|---|
| H02K 7/14 | (2006.01) |
| F16C 32/04 | (2006.01) |
| H01P 3/06 | (2006.01) |
| H02P 29/40 | (2016.01) |

(52) U.S. Cl.
CPC ............ F16C 32/0451 (2013.01); H01P 3/06 (2013.01); H02P 29/40 (2016.02)

(58) Field of Classification Search
CPC .......... H02P 29/40; H01P 3/06; G05B 19/058
See application file for complete search history.

(56) References Cited

U.S. PATENT DOCUMENTS

| | | | |
|---|---|---|---|
| 5,924,847 A | 7/1999 | Scaringe et al. | |
| 6,727,617 B2 | 4/2004 | McMullen et al. | |
| 7,504,739 B2 * | 3/2009 | Enis | F03D 9/28 290/55 |
| 8,384,232 B2 | 2/2013 | Myers et al. | |
| 8,564,281 B2 | 10/2013 | Filatov | |
| 8,739,538 B2 | 6/2014 | Myers et al. | |
| 2008/0252077 A1 | 10/2008 | Myers | |
| 2010/0301840 A1 | 12/2010 | Filatov | |
| 2011/0289922 A1 | 12/2011 | Scaringe et al. | |
| 2012/0013125 A1 | 1/2012 | Myers et al. | |

FOREIGN PATENT DOCUMENTS

CN    101050703 A  *  10/2007

OTHER PUBLICATIONS

Mahon et al., "50-Hz Heavy Duty Gas Turbines—Experience and Evolution," Siemens Power Generation (PG), upon information and belief, available no later than Jun. 8, 2021, 10 pages.

* cited by examiner

*Primary Examiner* — Karen Masih
(74) *Attorney, Agent, or Firm* — Fish & Richardson P.C.

(57) ABSTRACT

This disclosure describes a system for sending control signals and receiving sensor signals over cables at long distances. Electric currents and signals traveling down long cables can undergo phenomenon that are not present in relatively short cables. Therefore, this disclosure contemplates solutions for overcoming or compensating for these phenomenon to enable control of an electric machine using long cables. The solutions can include a signal conditioning circuit, configured to output a DC current corresponding to the sensed voltage associated with the sensor, a first conductor, that transmits the DC current from the signal conditioning circuit to the controller, and a signal generator, configured to receive the command signals and generate pulse width modulated (PWM) actuating signals based on the command signals.

20 Claims, 6 Drawing Sheets

ELECTRIC MACHINE CONTROL USING LONG CABLES

TECHNICAL FIELD

This disclosure generally relates to controlling an electric machine remotely, using long cables to provide for sensing and actuating of the electric machine.

BACKGROUND

Certain control applications require high frequency, low latency signals to be transmitted from a controller to an actuator. In instances where the controller is located remotely from the actuator, the length of a conductor used to transmit the control signals can have a negative effect on the control signal itself.

SUMMARY

The present disclosure involves systems, methods, and an apparatus for providing remote actuation of an electric machine. One example implementation includes a controller and a sensing signal system residing apart from the controller, the sensing signal system including: (1) a sensor circuit housing, (2) a sensor drive circuit that is positioned within the sensor circuit housing and configured to provide an AC signal to a sensor and output a sensed voltage associated with the sensor, (3) a signal conditioning circuit configured to output a DC current corresponding to the sensed voltage associated with the sensor and (4) a first electrical conductor connected between the signal conditioning circuit and the controller, where the controller receives DC current and generates electric machine command signals. The system further includes a signal generator that receives the command signals and generates pulse width modulated (PWM) actuating signals based on the command signals.

Implementations can optionally include one or more of the following features.

In some instances, an actuating signal system is further included, which includes a signal processing filter that filters high frequencies from the PWM actuating signals and a second electrical conductor coupled between the signal processing filter and one or more actuators in the electric machine. The second electrical conductor being electrically shielded and configured to transmit filtered PWM actuating signals to the one or more actuators in the electric machine. In some instance, the PWM frequency of the PWM actuating signals is in the range of 12 KHz to 48 KHz.

In some instances, the signal processing filter includes a first filter that is a trap filter which receives the PWM actuating signals from the signal generator and filters the PWM frequency in the PWM actuating signal. The signal processing filter can include a second filter that is a low-pass filter which filters high frequencies from a signal received from the first filter, and outputs a filtered PWM actuating signal.

In some instances, the first conductor and the second conductor have a length that is greater than 150 meters.

In some instances, the controller is located greater than 150 meters form the electric machine, and the controller reads DC current at a frequency greater than 24 KHz and transmit PWM actuating signals at a frequency greater than 300 Hz.

In some instances, a variable speed drive is provided and configured to receive three phase power generated from a device associated with the electric machine. A conditioning circuit measures a frequency of back electromotive force from the device associated with the electric machine, the conditioning circuit including a voltage divider, a low-pass filter, a voltage isolator, and a schmidt trigger. The conditioning circuit is configured to output a square wave at a frequency that corresponds to a rotational speed associated with the device.

In some instances, the electric machine includes active magnetic bearings and remote control is provided to the active magnetic bearings. In some instance, the sensed voltage corresponds to at least one of a speed of a rotor that is supported by the active magnetic bearings, or a position of a rotor that is supported by the active magnetic bearings.

In some instances, the controller is located greater than 150 meters from the electric machine.

In some instances, the signal conditioning circuit includes a 4-20 mA transmitter that provides a DC current signal in the range of 4 mA to 20 mA to be carried by the first conductor.

In some instances, the electric machine is a turbo expander generator that includes: (1) an impeller configured to be rotated by a flowing fluid, (2) a fluid stator, (3) one or more active magnetic bearings that are actuated by the PWM actuating signals, (4) an electric rotor coupled to and configured to rotate in unison with the impeller, and (5) an electric stator encircling the electric rotor, the electric stator including multiple coil windings.

One example implementation includes a method for remotely controlling an electric machine, the method including: Receiving, by a signal conditioner and from a sensor associated with the electric machine, a sensed voltage that corresponds to a physical parameter of the electric machine. Converting, by the signal conditioner, the sensed voltage to a current signal, that has a current that corresponds to the sensed voltage. Transmitting, via a first electrical conductor, the current signal from the signal conditioner to the controller. Determining, by the controller and based on the current signal, a command signal. Converting, by a signal generator, the command signal to a pulse-width modulated (PWM) actuating signal. Filtering, by a signal filter, high frequencies from the PWM actuating signal to produce a filtered PWM actuating signal. Transmitting, via a second electrical conductor, the filtered PWM actuating signal to an actuator associated with the electric machine. The actuator effecting the physical parameter of the electric machine.

Implementations can optionally include one or more of the following features.

In some instances the first conductor and the second conductor are greater than 150 meters long.

The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure describes a system for sending control signals and receiving sensor signals over cables at long distances. Some electronic machines may be physically located in hazardous or otherwise adverse locations. For example, an electric machine, such as a motor or generator, may be located in an explosion hazard location, where it undesirable to have expensive or sensitive electronic components that need to be sealed or fortified in order to minimize risk of explosion. In some implementations, it is desirable to be able to easily replace or upgrade certain components, without entering the hazardous location. In another example, an electric machine may produce large amounts of electromagnetic interferences (EMI), making the use of sensitive electronics to generate control signals challenging. The present disclosure contemplates positioning the controller, or other electronic devices in a separate, remote location from the electric machine, and using long cables (in some instances, greater than 150 or 300 meters or more) to transmit sensing signals and actuation signals between the electric machine to be controlled and the controller.

In general, electrical signals in electrical cables propagate as waves of voltages and currents, which wavelengths are defined by inductances and capacitances per units of the cable lengths, as well as the frequencies of the electrical signals—the higher the frequency, the shorter the signal wavelength for the same cable. If the cable length is much smaller than the electromagnetic wavelength, the wave natures of the voltages and currents can be neglected. However, if the cable length long relative to the wavelength (e.g., the cable length is greater than one-tenth of the waveform), the electrical signals typically have to be treated as electromagnetic waves. For example, for a 24 kHz signal a wave nature of the electrical signal needs to be taken into account in a typical cable over 300 m long. Examples of complications caused by the wave nature of the electrical signals include phase shifts between signals at the transmitting and the receiving cable ends and reflected waves coming back from the receiving to the transmitting end.

One example of an electric machine that would benefit from control via long cables is a turbo expander generator. In hydrocarbon processing, turbo expander generators can be used, for example, in lieu of an expansion valve, to convert excess energy unused in the expansion of a hydrocarbon gas and/or liquefied natural gas, to electrical energy, for example, where a processing plant receives hydrocarbon fluids from a pipeline or other transport. Hydrocarbon fluids, particularly at high pressures and/or extreme temperatures, are hazardous if they come in direct contact with personnel. As turbo expander generators include rotating components, dynamic seals, which are prone to failure, are relied upon to isolate personnel from hydrocarbons. Turbo expander generators can rely on active magnetic bearings (AMBs) which can improve their efficiency and reliability, if properly controlled.

Some aspects of the present disclosure provide unique advantages in that they permit increased flexibility in locations that a controller for an electric machine can be placed, as well as allowing for reduced hardening requirements for sensitive or expensive electronics in the controller.

Figure 1:
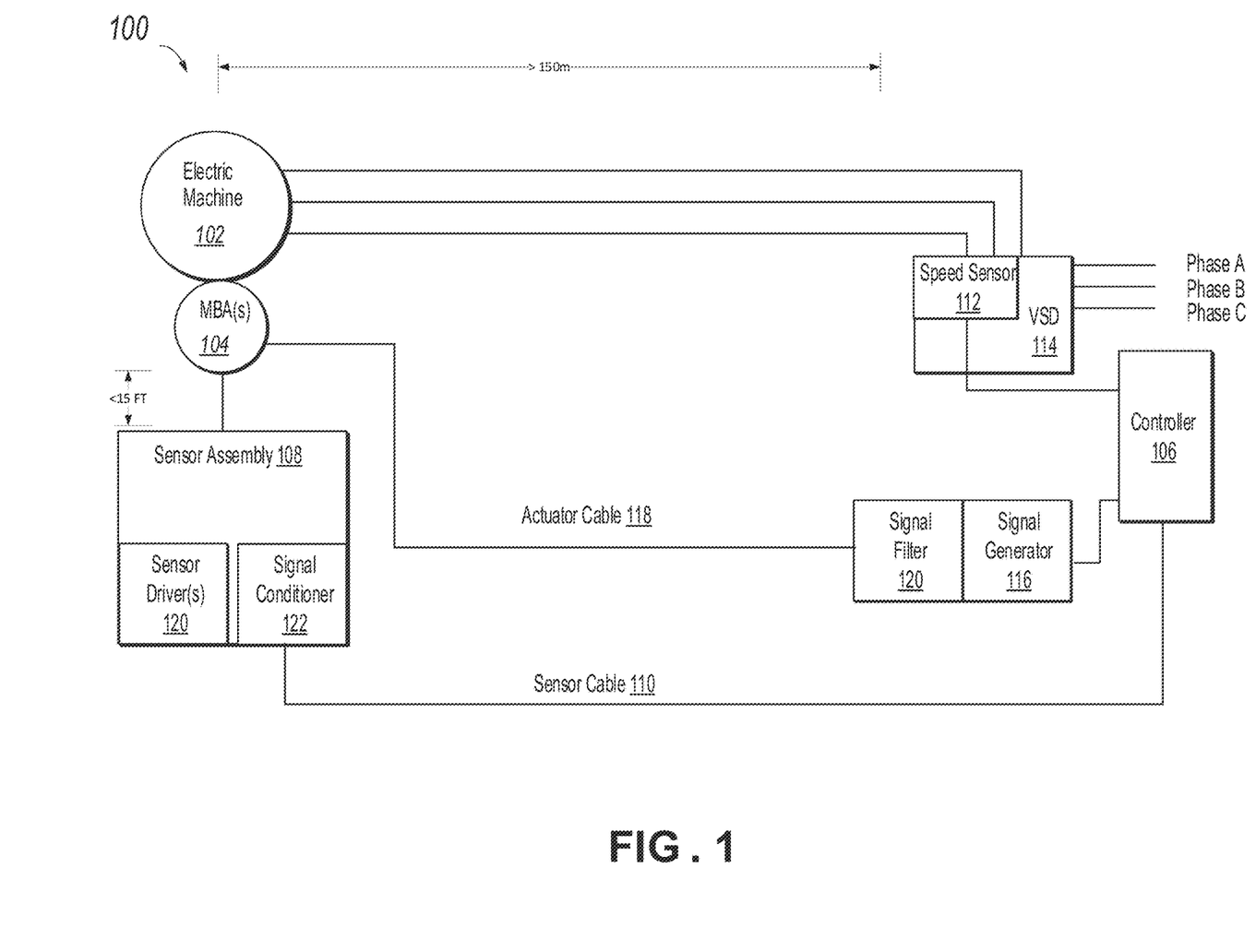
FIG. 1 is a schematic system architecture, showing control of an electric machine with a controller at a remote location.

Turning to the illustrated example implementation, FIG. 1 depicts an example system architecture, showing control of an electric machine with a controller at a remote location. The system includes an electric machine 102, with one or more active magnetic bearings (AMBs) which include one or more magnetic bearing actuators (MBAs) 104. The electric machine 102 can be, for example a motor, generator, or a rotating device which uses AMBs. While the illustrated example depicts sending actuating signals on an actuator cable 118 and receiving sensing signals on a sensor cable 110 in order to control magnetic bearing actuators 104 from a remote location, the present disclosure contemplates using long cables to send actuating signals and receive sensing signals for any system to be controlled. For example, in some implementations, where the electric machine 102 is an electric motor, long cables could be used to control or actuate the electric machine 102 itself, instead of magnetic bearing actuators 104 which are associated with the electric machine 102. Actuating signals can be used to control parameters associated with the electric machine 102 or the magnetic bearing actuators 104. In certain instances, actuating signals can be used to control position of a rotor in an AMB 104. In other instances where the electric machine 102 is a generator, the actuating signals can control power output of an electric machine 102. In certain instances, the electric machine 102 can be a motor, and the actuating signals can alter the torque supplied by the motor, or speed of the motor.

A controller 106 can receive sensed signals from a sensor assembly 108 which relay information related to the status of the magnetic bearing actuators 104 (e.g., position, rotational speed, torque, temperature, etc.). The sensed signals can be transmitted by the sensor cable 110 which, in certain instances, can be greater than 150 m long (e.g., 300 m, 600 m, etc.). Controller 106 can receive additional signals, for example, a speed signal from speed sensor 112, which can be a circuit that is built into, or otherwise integrated with the variable speed drive (VSD) 114. The controller 106 then, based on the sensed signals, determines an actuating signal to send to the magnetic bearing actuators 104. The actuating signals determined by the controller 106 can be transmitted to a signal generator 116. The signal generator 116 can convert the actuating signals generated by the controller 106 (e.g., low voltage direct current (DC) or digital signals) into actuating signals for actuating one or more actuators associated with the magnetic bearing actuators 104 (e.g., position actuators, motors, etc.). Actuating signals can include, but are not limited to pulse-width modulated (PWM) signals to generate desired currents, or voltages, from a power supply.

Prior to transmitting the PWM actuating signals over the actuator cable 118, the PWM actuating signals can be passed through a signal filter 120. Signal filter 120 can remove high frequency harmonics (e.g., the switching frequency of the PWM, or ringing frequencies associated with the square waveform of the PWM signals) in order to reduce or prevent high frequency reflections and waveguide effect in the long actuator cable 118. It should be noted that although actuator cable 118 and sensor cable 110 are illustrated as two separate cables, they could be combined, or in some implementations, each could include multiple separate cables. In some instances, where the magnetic bearing actuators 104 includes six total sensors and three actuators, there can be six separate sensor cables 110, and three actuator cables 118. In another implementation with the same number of actuators and sensors, there could be a single combined actuating and sensing cable, which serves the purpose of both actuating cable 118 and sensor cable 110. In some implementations, the sensor cable 110 and actuating cable 118 are shielded with a woven conductor to reduce or eliminate electromagnetic interference (EMI). EMI can be present, for example, due to large rotating machinery (e.g., the electric machine 102) or other nearby power electronics or sources.

A sensor assembly 108 can provide electrical power and signals to one or more sensors in the magnetic bearing actuators 104 via one or more sensor drivers 120. The sensor drivers 120 can provide a high frequency alternating current (AC) signal to the sensors within the magnetic bearing actuators 104, and output a voltage proportional to the sensed parameter. In certain instances, a sensor driver 120 may supply a position sensor in an AMB 104 with a 25 kHz excitation signal which can induce a time varying electric field that is altered by rotor motion in the AMB 104. The sensor driver 120 can then demodulate the return signal and determine a position of the rotor based on measured inductance in the sensor circuit. The output is, in one example, a 0 to 15V DC signal. In order to provide a signal to the controller that can be sampled at a high rate (e.g., 25 Khz, or 100 Khz, etc.) the output voltage of the sensor drivers 120 is converted by a signal conditioner 122 into a signal for transmission along the sensor cable 110. In some implementations the signal conditioner 122 converts the signal driver 120 output into a current signal (e.g., a 4-20 mA current loop), which is robust against EMI and can be transmitted over long cables such as the sensor cable 110 while maintaining the ability to be sampled at high frequencies.

Figure 2:
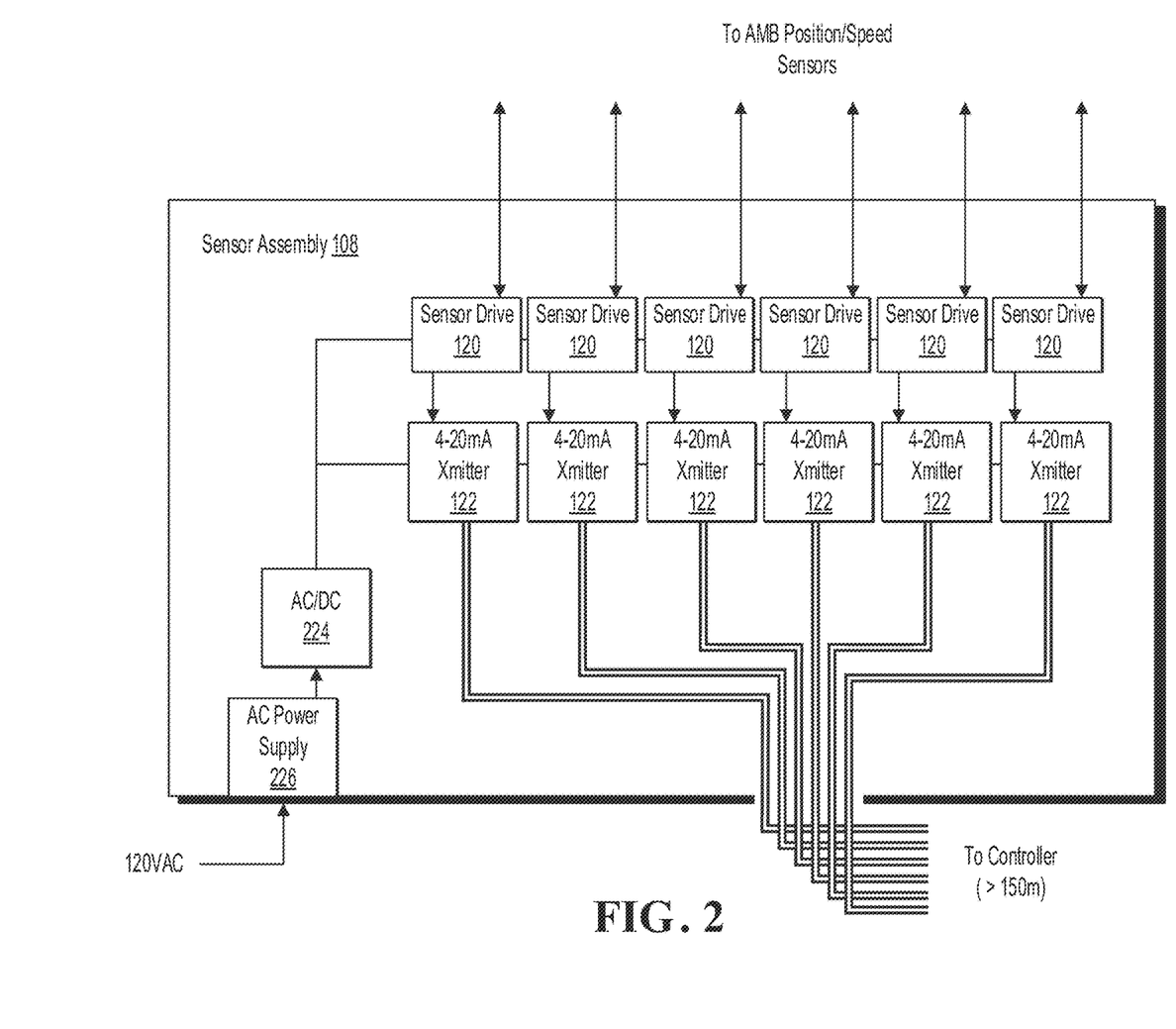
FIG. 2 is a schematic detailed architecture of a sensor assembly for generating sensing signals to be transmitted over a long cable.

FIG. 2 depicts a detailed architecture of an example sensor assembly for generating sensing signals to be transmitted over a long cable. In some implementations, the sensor assembly 108 can include relatively robust and/or inexpensive components when compared to the controller 106 of FIG. 1. Therefore in some implementations, the sensor assembly 108 can be located within the hazardous location where the device to be controlled (e.g., magnetic bearing actuators 104, or electric machine 102) is located. In certain instances, sensor assembly 108 can be explosion proof, waterproof, hermetically sealed, electrically hardened, or undergo any other process to ensure it is able to safely operate near the device to be controlled.

Sensor assembly 108 can include an AC power supply 226, which can receive AC power from an external source (e.g., a 120V, AC wall outlet). AC power from the power supply 226 in FIG. 2 is supplied to an AC/DC converter 224, which can convert the supplied AC power to power the various electronics within the sensor assembly 108. In some implementations, the AC/DC converter 224 provides a +15V DC supply, or other DC voltage. While illustrated as separate components, AC power supply 226 and AC/DC converter 224 can be provided as a single unit, or integrated components.

The sensor assembly 108 includes sensor drives 120, while six are illustrated in the example implementation, fewer, or greater sensor drives can be included. In FIG. 2, each sensor drive 120 is associated with a sensor (e.g., position sensor, speed sensor, etc.) that is located at an AMB. In certain instances, the sensors are reluctance sensors, which receive a high frequency AC carrier signal from the sensor drive 120 that is modulated by the AMB, with varying inductance based on position (or speed) of the rotor in the AMB. This high frequency carrier signal may be unsuitable for transmission over long cables, and thus the sensor assembly 108 can be located near (e.g., less than 15 meters) to the sensors in the AMB. The sensor drive 120 can then demodulate the carrier signal that is returned from the sensor and output a voltage (e.g., 2-15 VDC) that is proportional to the sensor output.

This sensed voltage can then be transmitted to a signal conditioner 122, illustrated in FIG. 2 as a 4-20 mA transmitter. Similarly to the sensor drives 120, six signal conditioners 122 are illustrated in FIG. 2, however more or fewer can be present. In certain instances, a signal conditioner 122 with multiple channels, can provide signals for two or more sensor drives 120. In general the signal conditioners 122 receive a voltage from the sensor drive 120, which is proportional to a sensed parameter. The signal conditioners 122 then convert the voltage to a signal that for transmission over a long cable (e.g., sensor cable 110 as discussed with reference to FIG. 1). In some implementations, the signal conditioners 122 convert the voltage into a current signal, which flows on a current loop, providing a continuously readable signal, where the sensed parameter is proportional to current in the loop. In some implementations, the signal conditioners 122 generate industry standard 4-20 mA current signals, which are robust against EMI, and can readily transmit information over long cables via twisted pair conductors with minimal concern for waveguide effects or other interference.

Figure 3:
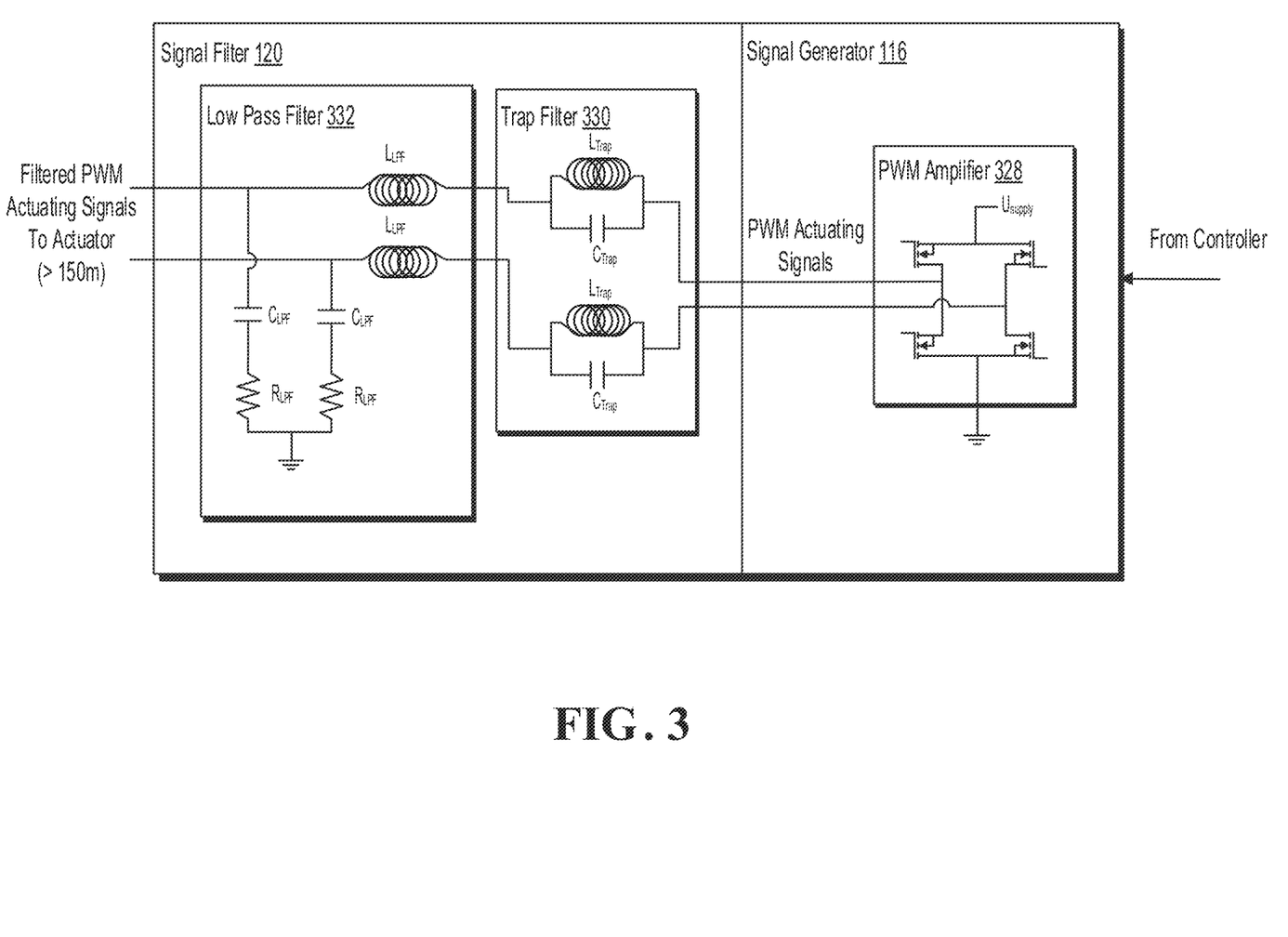
FIG. 3 is a schematic a detailed architecture of a signal generator and filter for transmitting pulse width modulated actuation signals over a long cable.

FIG. 3 depicts a detailed architecture of an example signal generator and filter for transmitting pulse width modulated actuation signals over a long cable. The signal generator 116 receives control signals from the controller (e.g., controller 106 as discussed with reference to FIG. 1). These control signals can indicated desired voltages to deliver to actuators associated with the device being controlled (e.g., AMB 104 of FIG. 1). The signal generator 116 accepts the control signals and generates appropriate voltages to drive the actuators. In certain instances, the signal generator 116 can generate a DC voltage between zero and 180V using a PWM amplifier 328.

The PWM amplifier 328 can, in certain instances, take a 200V supply voltage, and with switching field-effect transistors, reduce the voltage to a PWM actuating voltage as directed by the command signals. While this PWM actuating voltage may vary at relatively low frequencies (e.g., 500 Hz) while controlling the device to be controlled (e.g., AMB 104 of FIG. 1), the PWM amplifier 328 generates the actuating voltages by altering the duty cycle of a square wave from the supply voltage. As a result, the PWM actuating signals will contain high frequencies based on the switch rate of the PWM amplifier 328, as well as harmonics induced by the square waveform created.

A signal filter 120 is provided to remove these higher frequency signals from the PWM actuating signals, in order to reduce or avoid waveguide and resonant effects when transmitting the PWM actuating signals over long cables. The signal filter can include a trap filter 330 and a low pass filter 332. The trap filter 330 is a filter with components configured to reject the specific switching frequency of the PWM amplifier 328. In some instances, if the PWM amplifier 328 has a transistor switching frequency of 25 kHz, in certain instances, the trap filter 330 has an inductance $L_{trap}$ and capacitance $C_{trap}$ tuned to act as a notch filter, removing most of the 25 kHz signal energy from the PWM actuating signals. Following the trap filter 330, a low pass filter 332 can reduce or remove any remaining harmonic or higher frequencies from the PWM actuating signals, for example, by permitting only low frequency (e.g., less than 2 kHz, or less than 1 kHz) signals to pass. While illustrated as passive circuits including capacitors, resistors, and inductors, trap filter 330 and low pass filter 332 can be any filter, including active digital filters, mechanical signal filters, or other signal filtering systems.

Figure 4:
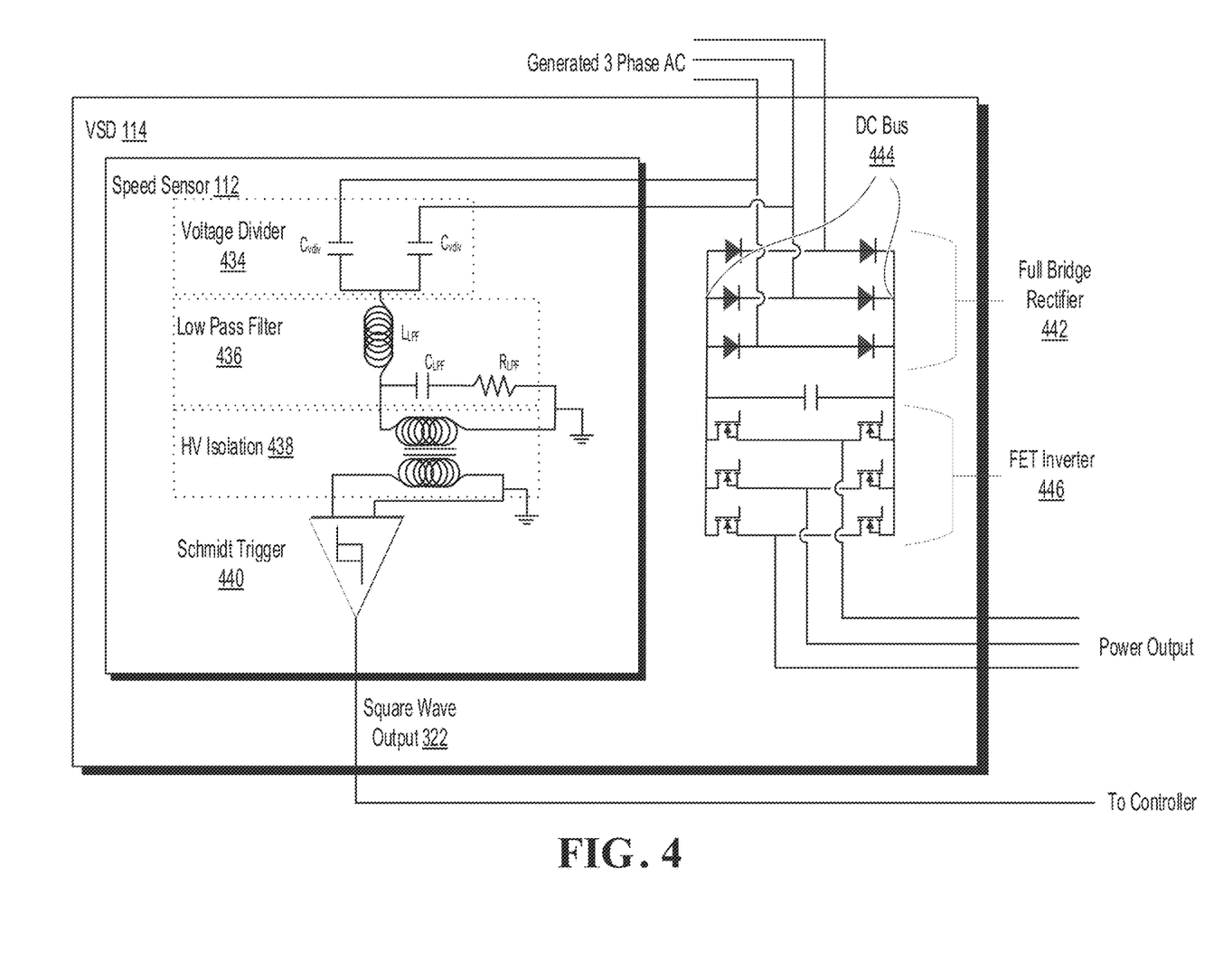
FIG. 4 is a schematic detailed architecture of a speed sensing circuit.

FIG. 4 depicts a detailed architecture of an example speed sensing circuit. The speed sensing circuit illustrated in FIG. 4 can be used in conjunction with, or as an alternative to one or more speed sensors integrated in the device to be controlled (e.g., magnetic bearing actuators 104) and sensed via the sensor assembly 108 as discussed with reference to FIGS. 1 and 2. The speed sensing circuit of FIG. 4 outputs a square wave signal that has a frequency proportional to a voltage produced by a three phase electric machine (e.g., back electro-motive force (EMF)) such as electric machine 102 of FIG. 1.

In certain instances, the VSD 114 includes an array of diodes and field effect transistors as well as at least one capacitor. The VSD 114, in this implementation, receives three-phase power generated from an electric machine (e.g., electric machine 102 of FIG. 1) and rectifies it using a full bridge rectifier 442 to a DC voltage present on a DC bus 444. A field effect transistor inverter 446 can then convert power on the DC bus 444 to AC power at a frequency and voltage for external use. In some instances, the VSD 114 can convert generated three-phase power into 60 Hz, 3 phase, 240 volt AC power to supply standard electronics. As voltage and frequency of the generated power may fluctuate (e.g., with speed of the electric machine), the VSD 114 can output a constant AC supply.

Speed sensor 112 can be integrated into, or separate from the VSD 114, and infers the speed of an electric machine generating back EMF by measuring a line-to-line voltage generated by the electric machine. Speed sensor 112 includes a voltage divider 434 which provides an output voltage that is proportional to the amplitude of the back EMF in the generated three phase AC. The output of the voltage divider 434 is received at a low pass filter 436, which can generally filter high frequency noise from the produced voltage. A high voltage isolation circuit 438 is provided to step down the voltage to a reduced level for digital electronics. The resulting output of the high voltage isolation circuit 438 is a low voltage, filtered waveform that has a frequency, which is proportional to the back EMF, or line-to-line voltage in the generated 3 phase AC. This waveform is provided as input to a Schmidt trigger 440, which can generate a digital square wave to be read by the controller (e.g., controller 106 of FIG. 1), which can determine a rotational speed of the electric device based on the frequency or period of the output square wave.

Figure 5:
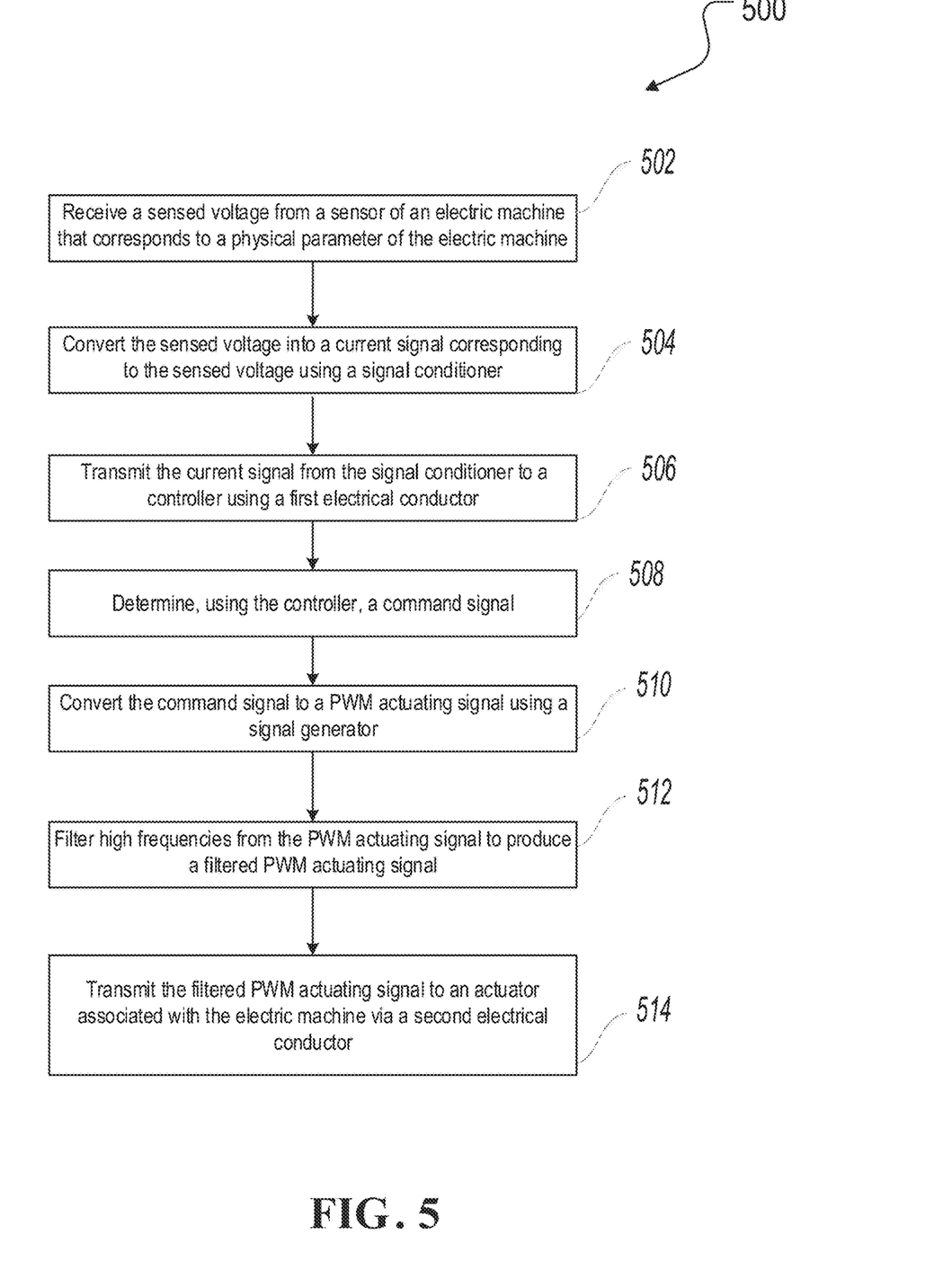
FIG. 5 is a flowchart describing a method for remotely controlling an electric machine.

FIG. 5. is a flowchart describing a method for remotely controlling an electric machine. FIG. 5 is an example method illustrated as being executed by a system as system 100 of FIG. 1. However, it will be understood that method 500 may be performed, for example, by any other suitable system, environment, software, and hardware, or a combination of systems, environments, software, and hardware as appropriate.

At 502, a sensed voltage is received at a signal conditioner that corresponds to a physical parameter of an electric machine. For example, a speed sensor on the electric machine can produce a voltage that is proportional to the rotational speed of the machine. In another example, a position sensor may produce a voltage that corresponds to a relative position of a rotor in an active magnetic bearing. An electric machine can be a motor, generator, active magnetic bearing, or other electric device that converts electrical power to or from mechanical power.

At 504, a signal conditioner converts the sensed voltage into a current signal corresponding to the sensed voltage. In certain instances, the signal conditioner can be a 4-20 ma transmitter, which generates a current in the range of 4 to 20 milliamps.

At 506, the current signal is transmitted to a controller using a first electrical conductor. The first electrical conductor can be a cable, or wire, or pair of cables or wires that form an electrical loop. The first electrical conductor can be greater than 150 meters in length and can be insulated, or shielded from electromagnetic interference.

At 508, the controller determines a command signal to be sent to an actuator of the electrical machine based on the sensed signal. For example, sensed signal is a speed signal, and the controller determines that the electrical machine is rotating faster than the commanded speed, the controller can generate a command signal to reduce power to the electrical machine (if the machine is a motor) or increase current output from the machine (if the machine is a generator) in order to reduce the rotational speed of the machine.

At 510, the command signal is converted into a PWM actuating signal using a signal generator. The signal generate can be a simple PWM amplifier, with two or more transistors, that output a PWM signal at a duty cycle according to the command signal.

At 512, high frequencies are filtered from the PWM actuating signal, producing a filtered PWM actuating signal. The PWM actuating signals can be passed through a signal filter, which can include a trap filter, and a low-pass filter. The trap filter can be an active or passive circuit, which eliminates specific frequencies from the PWM actuating signal. The low-pass filter can be a passive or active circuit that reduces the amplitude of frequencies above a certain cutoff frequency.

At 514, the filtered PWM actuating signal is transmitted, via a second electrical conductor, to an actuator associated with the electrical machine. The second conductor can be a cable, or set of cables, which are greater than 150 m. In some implementations, the second conductor is shielded from electromagnetic interference. The actuator associated with the electrical machine can be a magnetic bearing actuator, or a command signal for a motor, or an electrical signal to operate a servo motor or other actuator in order to change the operation of the electric machine.

Figure 6:
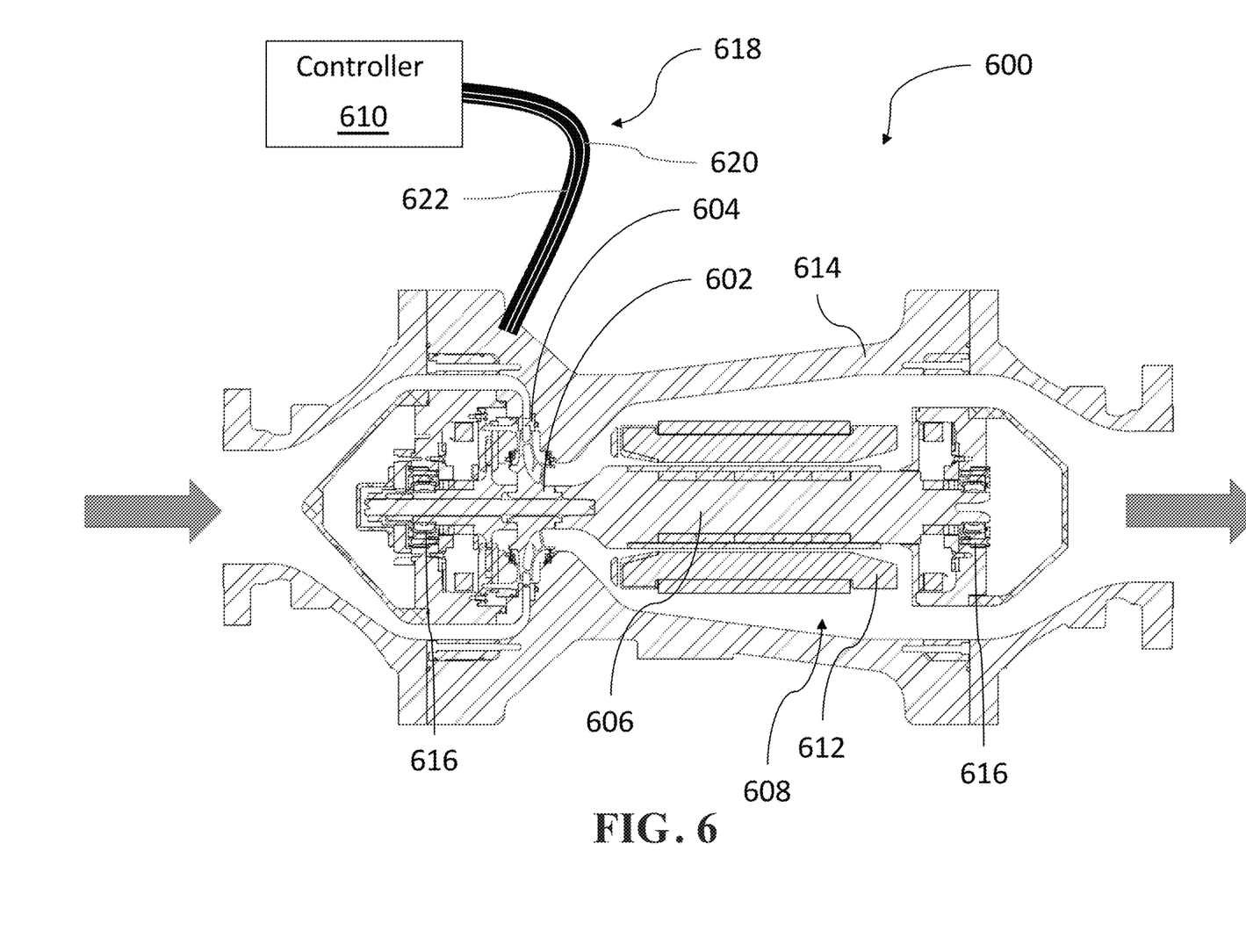
FIG. 6 is a side, half cross sectional view of an example turbo expander that can be controlled using a controller at a remote location.

FIG. 6 is a side, half cross sectional view of an example turbo expander 600. The turbo expander 600 includes an impeller 602 configured to be rotated by a flowing fluid. In certain instances, the flowing fluid can be fluid from a hydrocarbon source feeding the turbo expander 600. Such hydrocarbons are depressurized by the turbo expander 600, particularly by transferring energy to the rotating impeller 602. Surrounding the fluid impeller 602 is a fluid stator 604 configured to regulate a flow through the turbo expander 600.

An electric rotor 606 is coupled to, and configured to rotate in unison with, the impeller 602. The electric rotor 606 can include an inductive rotor (e.g. squirrel cage or armature wound rotor), a permanent magnet rotor, a wound field synchronous rotor, or any other type of electric rotor. While illustrated and described as being directly coupled to rotate in unison, a gearbox and/or magnetic coupling can be used to couple the electric rotor 606 and the impeller 602 without departing from this disclosure. An electric stator 608 encircles the electric rotor 606. The electric stator 608 includes coiled windings 612 through which electric current can flow. In operation, the field interaction between the electric rotor and the electric stator 608 can produce electric current and/or can be used to regulate a speed of an electric rotor 606, and therefore the impeller 602. For example, the electric rotor 606 and electric stator 608 can act as a generator, and an adjustable electric load can be used to regulate a rotational speed of the electric rotor. Such a variable load can be included with and/or controlled by a controller 610.

In some implementations, the electric rotor 606 and the impeller 602 share a common, hermetically sealed housing 614 that defines a flow path from an of the turbo expander 600 toward an outlet downstream of the electric rotor. In such implementations, an annulus, defined by an outer surface of the electric rotor 606 and an inner surface of the stator windings 612, is "wetted", or exposed to the process fluid. In some implementations, a second annulus defined by an inner surface of a housing 614 and an outer surface of the stator can be similarly wetted. Regardless, such a hermetically sealed housing 614 arrangement reduces the risk of personnel exposure to the process fluid as eliminating dynamic seals eliminates them as a failure point as well.

In some implementations, the turbo expander 600 includes an active magnetic bearing 616 supporting the impeller 602 and/or the electric rotor 606. In such an implementation, the shaft of the electric rotor and/or impeller do not directly come in contact with a bearing surface attached to the housing 614. Such implementations can include active bearing control monitored and controlled by the controller 610. While primarily described and illustrated as using active magnetic bearings, other bearing can be used without departing from this disclosure. For example, passive magnetic bearings can be used. Alternatively or in addition, anti-friction bearings can be used (e.g., ball bearings or roller bearings). Similarly, journal bearing can be used. In some implementations, types of bearings can be mixed, for example, an antifriction bearing and an active magnetic bearing can be used simultaneously.

In some implementations, the controller 610 can be located some distance from the turbo expander 600. For example, the controller can be 150 meters from the turbo expander, 300 meters from the turbo expander, or 500 meters from the turbo expander. The controller 610 is connected to the turbo expander by a cable 618. In some implementations, the cable 618 includes a first conductor 620 and a second conductor 622. The first conductor 620 is configured to filtered a pulse width modulated actuating signals to the active magnetic bearing 616. In some implementations, the first conductor is electrically shielded. The second conductor connects the controller to the active magnetic bearing 616. The second conductor 622 is configured to exchange a direct current between the controller 610 and the active magnetic bearing 616.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A system for providing remote actuating of an electric machine comprising:
    a controller;
    a sensing signal system residing apart from the controller, the sensing signal system comprising:
        a sensor circuit housing;
        a sensor drive circuit positioned within the sensor circuit housing, configured to provide an AC signal to a sensor and output a sensed voltage associated with the sensor;
        a signal conditioning circuit, configured to output a DC current corresponding to the sensed voltage associated with the sensor; and
        a first electrical conductor connected between the signal conditioning circuit and the controller and configured to transmit the DC current from the signal conditioning circuit to the controller, wherein the controller is configured to receive the DC current and generate electric machine command signals; and
    a signal generator, configured to receive the command signals and generate pulse width modulated (PWM) actuating signals based on the command signals.

2. The system of claim 1 comprising:
    an actuating signal system comprising:
        a signal processing filter, configured to filter high frequencies from the PWM actuating signals; and
        a second electrical conductor coupled between the signal processing filter and one or more actuators in the electric machine and configured to transmit filtered PWM actuating signals to the one or more actuators in the electric machine, wherein the second conductor is electrically shielded.

3. The system of claim 2, wherein a PWM frequency of the PWM actuating signals is in a range of 12 KHz to 48 KHz.

4. The system of claim 2, wherein the signal processing filter comprises:
    a first filter, wherein the first filter receives the PWM actuating signals from the signal generator and is a trap filter, configured to filter the PWM frequency in the PWM actuating signal; and
    a second filter, wherein the second filter receives a signal from the first filter and is a low-pass filter configured to filter high frequencies and output the filtered PWM actuating signal.

5. The system of claim 2, wherein the first conductor and the second conductor have a length that is greater than 150 meters.

6. The system of claim 5, wherein the controller is located greater than 150 meters from the electric machine, and wherein the controller reads the DC current at a frequency greater than 24 KHz and transmits the PWM actuating signals at a frequency greater than 300 Hz.

7. The system of claim 1, comprising:
    a variable speed drive (VSD) configured to receive three phase power generated from a device associated with the electric machine; and
    a conditioning circuit configured to measure a frequency of back electromotive force (EMF) from the device associated with the electric machine comprising a voltage divider, a low-pass filter, a voltage isolator, and a schmidt trigger, wherein the conditioning circuit is configured to output a square wave at a frequency that corresponds to a rotational speed associated with the device.

8. The system of claim 1, wherein the electric machine comprises active magnetic bearings (AMBs), and wherein remote control is provided to the AMBs.

9. The system of claim 8, wherein the sensed voltage corresponds to at least one of:
    speed of a rotor that is supported by the AMBs; or
    position of a rotor that is supported by the AMBs.

10. The system of claim 1, wherein the controller is located greater than 150 meters from the electric machine.

11. The system of claim 1, wherein the signal conditioning circuit comprises a 4-20 mA transmitter, configured to provide a DC current signal in a range of 4 mA to 20 mA to be carried by the first conductor.

12. The system of claim 1, wherein the electric machine is a turbo expander generator comprising:
   an impeller configured to be rotated by a flowing fluid;
   a fluid stator;
   one or more active magnetic bearing, wherein the active magnetic bearings are actuated by the PWM actuating signals;
   an electric rotor coupled to and configured to rotate in unison with the impeller; and
   an electric stator encircling the electric rotor, the electric stator comprising a plurality of coil windings.

13. A method for remotely controlling an electric machine, the method comprising:
   receiving, by a signal conditioner and from a sensor associated with the electric machine, a sensed voltage that corresponds to a physical parameter of the electric machine;
   converting, by the signal conditioner, the sensed voltage to a current signal, wherein the current signal has a current that corresponds to the sensed voltage;
   transmitting, via a first electrical conductor, the current signal from the signal conditioner to a controller;
   determining, by the controller and based on the current signal, a command signal;
   converting, by a signal generator, the command signal to a pulse-width modulated (PWM) actuating signal;
   filtering, by a signal filter, high frequencies from the PWM actuating signal to produce a filtered PWM actuating signal; and
   transmitting, via a second electrical conductor, the filtered PWM actuating signal to an actuator associated with the electric machine, wherein the actuator effects the physical parameter of the electric machine.

14. The method of claim 13, wherein the first conductor and the second conductor are greater than 150 meters long.

15. An apparatus for providing remote control of active magnetic bearings (AMBs) of an electric machine comprising:
   a controller;
   a sensing signal system comprising:
      a sensor housing;
      a sensor drive circuit positioned within the sensor housing, configured to provide an AC signal to a sensor and output a sensed voltage associated with the sensor;
      a signal conditioning circuit, configured to output a DC current corresponding to the sensed voltage associated with the sensor; and
      a first electrical conductor connected between the signal conditioning circuit and the controller and configured to transmit the DC current from the signal conditioning circuit to the controller, wherein the controller is configured to receive the DC current and generate electric machine command signals;
   a signal generator, configured to receive the command signals and generate pulse width modulated (PWM) actuating signals based on the command signals;
   an actuating signal system comprising:
      a signal processing filter, configured to filter high frequencies from the PWM actuating signals; and
      a second electrical conductor connected between the signal processing filter and one or more actuators in the AMB and configured to transmit filtered PWM actuating signals to the one or more actuators in the AMB, wherein the second conductor is electrically shielded.

16. The apparatus of claim 15, wherein a PWM frequency of the PWM actuating signals is in a range of 12 KHz to 48 KHz.

17. The apparatus of claim 15, wherein the signal processing filter comprises:
   a first filter, wherein the first filter receives the PWM actuating signals from the signal generator and is a trap filter, configured to filter the PWM frequency in the PWM actuating signal; and
   a second filter, wherein the second filter receives a signal from the first filter and is a low-pass filter configured to filter high frequencies and output the filtered PWM actuating signal.

18. The apparatus of claim 15, comprising:
   a variable speed drive (VSD) configured to receive three phase power generated from a device associated with the electric machine; and
   a conditioning circuit configured to measure a frequency of back electromotive force (EMF) from the device associated with the electric machine comprising a voltage divider, a low-pass filter, a voltage isolator, and a schmidt trigger, wherein the conditioning circuit is configured to output a square wave at a frequency that corresponds to a rotational speed associated with the device.

19. The apparatus of claim 15, wherein the first conductor and the second conductor have a length that is greater than 150 meters.

20. The apparatus of claim 15, wherein the signal conditioning circuit comprises a 4-20 mA transmitter, configured to provide a DC current signal in a range of 4 mA to 20 mA to be carried by the first conductor.

* * * * *